No. 692,311. Patented Feb. 4, 1902.
A. S. KROTZ.
RUBBER TIRE.
(Application filed Apr. 29, 1901.)
(No Model.)
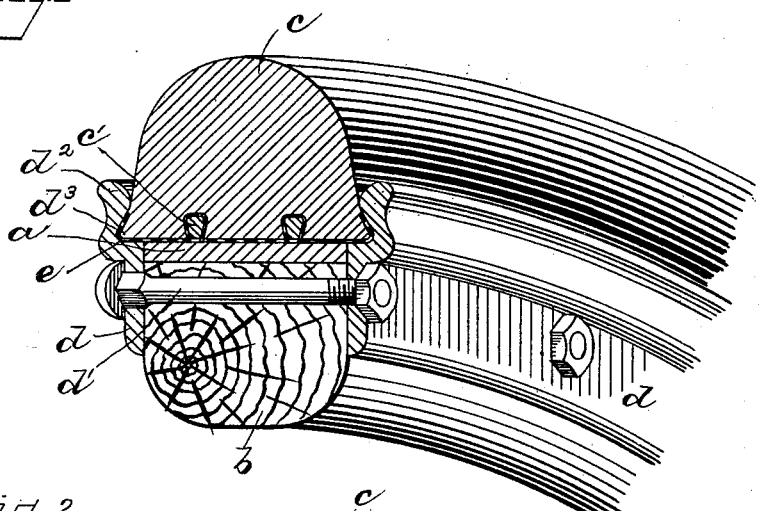
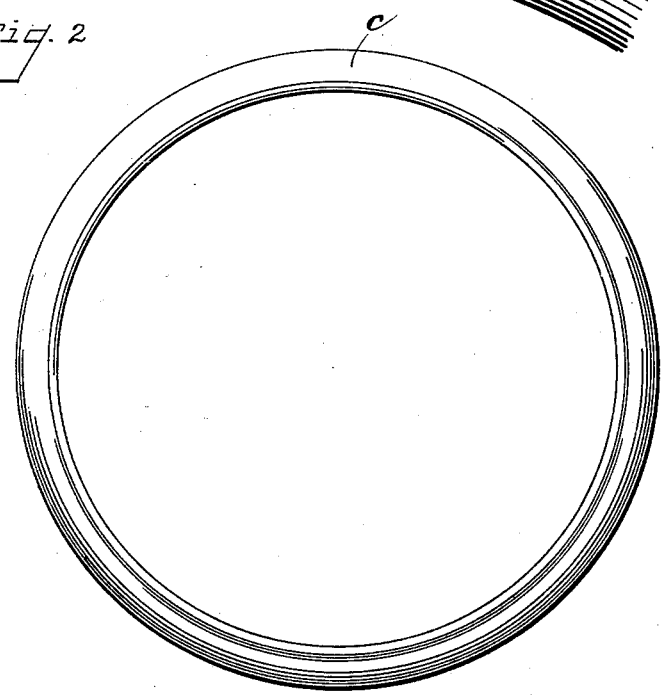
WITNESSES:
INVENTOR.
BY
ATTORNEY.

UNITED STATES PATENT OFFICE.

ALVARO S. KROTZ, OF SPRINGFIELD, OHIO, ASSIGNOR TO CONSOLIDATED RUBBER TIRE COMPANY, OF JERSEY CITY, NEW JERSEY, A CORPORATION OF NEW JERSEY.

RUBBER TIRE.

SPECIFICATION forming part of Letters Patent No. 692,311, dated February 4, 1902.

Application filed April 29, 1901. Serial No. 58,028. (No model.)

*To all whom it may concern:*

Be it known that I, ALVARO S. KROTZ, a citizen of the United States, residing at Springfield, in the county of Clark and State of Ohio, have invented certain new and useful Improvements in Rubber Tires, of which the following is a specification.

My invention relates to improvements in rubber-tire wheels, and especially relates to wheels designed for use on vehicles, such as carriages, wagons, buggies, and automobiles.

My invention consists in the constructions and combinations of parts hereinafter described, and set forth in the claims.

In the accompanying drawings, Figure 1 is a sectional elevation of a wheel-rim, shown partly in perspective, embodying my invention. Fig. 2 shows a continuous or endless tire.

Like parts are represented by similar letters of reference in both of the views.

In contructing my improved tire I employ a flat metallic band $a$, which is fitted to the wooden felly $b$ of the wheel. The rubber tire $c$ is preferably endless, is flat on its base, and is preferably of greater width than the rim on which it is seated. The tread of the tire is formed on the arc of a circle of smaller diameter than the width of its base and as it nears the base is curved outwardly and rounded, forming a sloping shoulder on each side of the base of the tire. The tire is provided in its base with the endless metallic V-shaped strips $c'$, which are preferably vulcanized in place. The side plates $d$ are clamped to the sides of the felly and rim by means of the bolts $d'$, which extend at intervals through the felly and have flanges extending outwardly in a reverse curve, forming a channel for the rubber tire. These flanges $d^2$ are recessed on their inner sides at $d^3$ and form a base for the tire where it extends over the face of the rim and further engage the sloping shoulders of the tire to hold the same in place and then recede in a rounded edge, leaving a space between the upper portions of said flanges and the tire. The base, with its recesses for the metallic strips, and the sloping shoulders of the tire where they contact with the channel I cover with the canvas $e$ to strengthen the tire. The recesses are made sufficiently large at the bottom, so that the canvas and the metallic strips may be readily put in place while the tire is in its soft pliable state. The tire is then put in the mold for vulcanizing, and the mold pressing the tire closes the recesses to the shape of the V-shaped strips and are vulcanized to this form. It is well known that rubber is non-compressible or only slightly compressible, and by making the tire slightly wider at the oppositely-extending shoulders than the channel the pressure of the flanges of the channel when the side plates are bolted in place causes the rubber to press under the V-shaped sides of the strips and against the bottom of the channel, thus firmly seating the tire.

In applying my tire I take a wheel, with its wooden felly and metallic rim, and place a continuous tire, with its endless metallic strips, on the rim, and then bolt the side plates, with their flanges, in place, the flanges fitting over and slightly compressing the sloping shoulders of the tire, as heretofore described, or the metallic strips may be first shrunk on the rim, and the tire in a single piece, not continuous, may be then put on, the elasticity of the rubber permitting the recesses to slip over the V-shaped strips, and the tire is then held by compression of the flanges of the side pieces, as hereinbefore stated.

By placing my retaining-strips in the base of the tire I am enabled to join and make them endless before putting them in the tire, which, as will be readily seen, is a great advantage over having to make the joint after the strips are in the tire and then bringing the tire together. Furthermore, after the tire is applied it may be repaired without having to break the retaining-strips for that purpose.

While I have shown the tire with sloping shoulders and of greater width than the metallic band, it is obvious that the tire may be of the same width, with such modifications of the shoulders and side pieces as will compress the tire in its seat, as hereinbefore described.

Having thus described my invention, I claim—

1. In a rubber tire for vehicle-wheels, the combination with the wooden felly of the wheel, and a flat metallic band, of a continuous rubber tire, V-shaped endless metallic strips in the base of said tire, said tire formed on its tread in the arc of a circle of less diameter than the width of its base, and curved outwardly near its base, forming a sloping shoulder on each side at its base, plates upon each side of said felly and rim, with flanges forming a channel for said tire slightly narrower than the width of the tire at said shoulders, extending upwardly and inwardly over said sloping shoulders to press said tire in its seat under the angles formed by said V-shaped strips and then outwardly, leaving a space between said tire and the upper portion of said flanges, and bolts extending at intervals through said felly to clamp said side plates in position, substantially as specified.

2. In a rubber tire for vehicle-wheels, the combination with the wooden felly of the wheel, and a flat metallic band, of a continuous rubber tire, V-shaped endless metallic strips vulcanized in the base of said tire, said tire formed narrower on its tread than at its base, with shoulders on each side at its base, plates upon each side of said felly and rim, with flanges forming a channel for said tire slightly narrower than the width of said tire at the shoulders, extending upwardly and inwardly over said shoulders to compress said tire in its seat under the angles formed by said V-shaped strips, and then outwardly, leaving a space between said tire and the upper portion of said flanges, and bolts extending at intervals through said felly, to clamp said side plates in position, substantially as specified.

3. In a vehicle-wheel, the combination with the wooden felly of the wheel, and a flat metallic band, of a continuous rubber tire, V-shaped endless metallic strips in the base of said tire, said tire being of greater width than said rim, narrower on its tread than at its base, with shoulders formed on each side at its base, plates upon each side of said felly and rim, with flanges forming a channel for said tire, having recesses to seat said tire where it extends over the base of said rim, and extending upwardly and inwardly over said shoulders to compress said tire, and then outwardly, leaving a space between said tire and the upper portion of said flanges, and bolts extending at intervals through said felly to clamp said side plates in position, substantially as specified.

4. In a vehicle-wheel, the combination with the wooden felly of the wheel and a flat metallic band of equal width with said felly, of a continuous rubber tire, V-shaped endless metallic strips vulcanized in the base of said tire, said tire being of greater width than said rim, flat on its base and formed on its tread in the arc of a circle of less diameter than the width of its base and curved outwardly near its base, forming a sloping shoulder on each side at its base, plates upon each side of said felly and rim with flanges forming a channel for said tire having recesses to seat said tire where it extends over the edges of said rim, and extending upwardly and inwardly over said sloping shoulders to compress said tire and then outwardly, leaving a space between said tire and the upper portion of said flanges, and bolts extending at intervals through said felly to clamp said side plates in position, substantially as specified.

In testimony whereof I have hereunto set my hand this 24th day of April, A. D. 1901.

ALVARO S. KROTZ.

Witnesses:
PERCY NORTON,
CHAS. I. WELCH.